Patented Oct. 3, 1922.

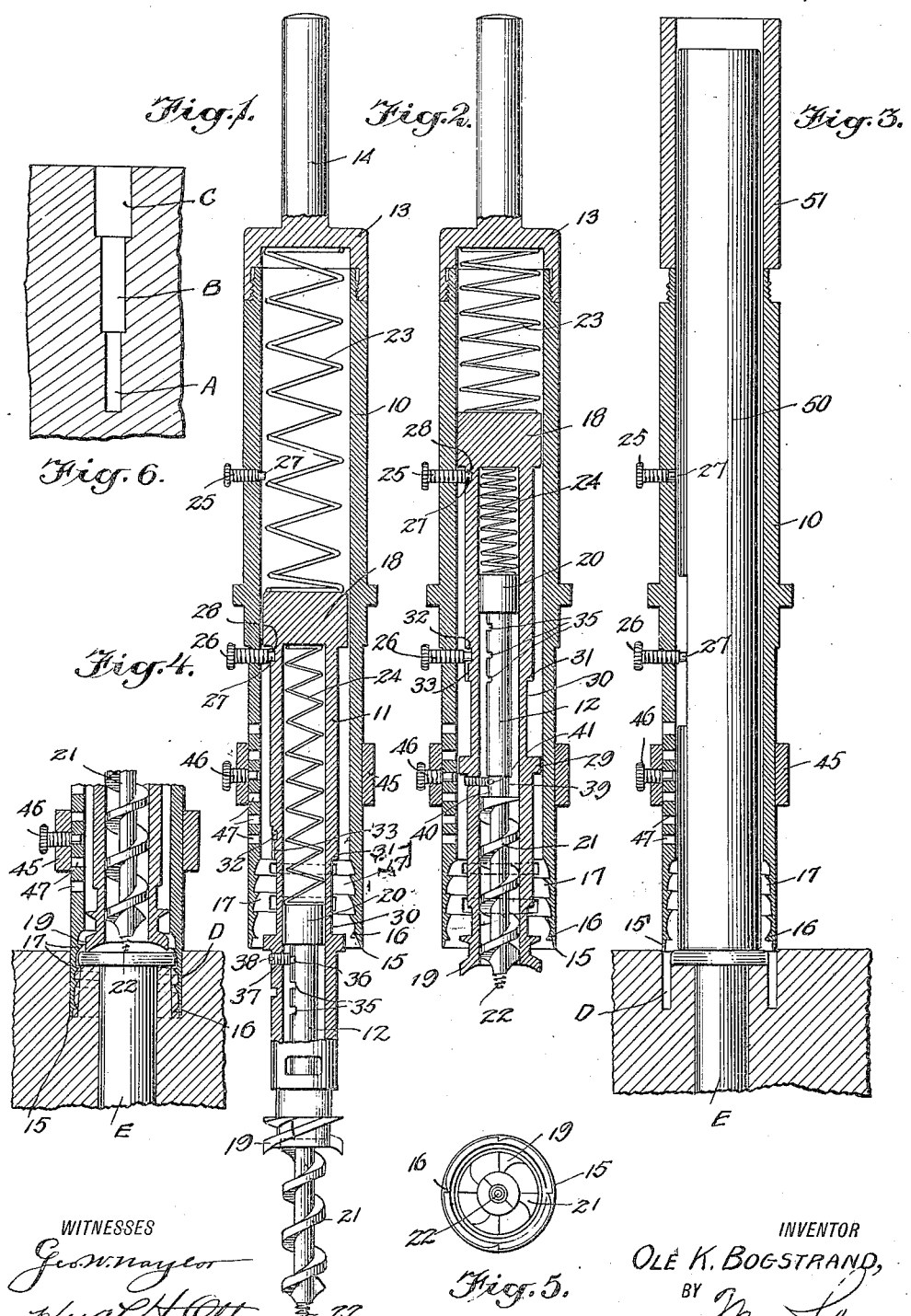

1,430,932

UNITED STATES PATENT OFFICE.

OLE K. BOGSTRAND, OF BROOKLYN, NEW YORK.

TOOL.

Application filed December 3, 1921. Serial No. 520,972.

*To all whom it may concern:*

Be it known that I, OLE K. BOGSTRAND, a citizen of the United States, and a resident of the city of New York, borough of Brooklyn, in the county of Kings and State of New York, have invented a new and Improved Tool, of which the following is a full, clear, and exact description.

This invention has relation to tools and refers more particularly to an improvement in tools for the laying of decks, flooring, or the like, and for the refinishing or repairing of the same.

The present invention contemplates a tool which includes a number of elements or parts capable of association and adjustment to render the same useful for various purposes in the laying or repairing of decks or floors.

Primarily certain of the elements or parts are adapted to be associated for initially and simultaneously forming a screw-receiving opening including a plurality of bores of various diameters arranged in axial prolongation respectively for the reception of the threaded portion of the shank, the smooth portion of the shank, and the head and filler plug.

Under the present practice when a deck has become worn to a point where the nails, screws or other fastening elements are exposed, a new deck is required as it is practically impossible to repair the worn one without marring the boards which go to make up the deck. The difficulty experienced in attempts to repair the deck lies in the fact that the driving of the nails or screws a sufficient further distance below the surface of the deck to reinsert new plugs invariably results in the chipping or splitting or otherwise marring the surface adjacent the screw or nail head.

As a further object the invention therefore contemplates a tool of the character described which affords means for cutting an annular recess concentric to the nail or screw head to admit of the driving of the same further downward without marring the surface adjacent the said opening or to permit of the removal of old fastening elements and the insertion of new ones.

As a still further object the invention contemplates a tool of the character described which may be employed for the removal of screws having broken heads, which may be employed as a guard for driving the nail or screw further down for the insertion of a new plug and which includes telescopic elements which function as guides for the cutting of the concentric groove heretofore explained.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawing—

Figure 1 is a side view of the tool with parts broken away and shown in section, illustrating the adjustment and arrangement of the parts thereof for the cutting of a screw-receiving opening.

Fig. 2 is a similar view illustrating the parts thereof in telescoped relation.

Fig. 3 is a similar view illustrating the tool when used for the purpose of driving a nail further down in the deck for the insertion of a new plug.

Fig. 4 is a detail fragmentary view illustrating the manner in which the tool is used for the cutting of an annular groove concentric to the nail or screw head for the purpose of withdrawing or removing the same.

Fig. 5 is a bottom plan view of the tool.

Fig. 6 illustrates a screw receiving opening formed by means of the tool.

Referring to the drawings by characters of reference the tool comprises an outer, intermediate and inner sections 10, 11 and 12. The outer section 10 is of cylindrical formation and is formed at its upper end with a removable closure head 13 provided with an axially projecting shank 14 whereby the tool may be associated with a suitable form of brace for rotating the tool when desired. The outer section is provided at its lower extremity with a circular cutting edge 15, internal cutting teeth 16 and a series of inner spiral convolutions 17 of gradually decreasing diameters from the outer or lower end of the section toward the inner end thereof. The intermediate section 11 is also of cylindrical formation and is provided at its upper end with an integral head 18 for closing the same. The head 18 is of a diameter to snugly fit within the section 10 for guiding and maintaining the section 11 in axial alignment within the outer section. The section 11 is open at its lower end and provided with external cutting teeth 19, for the purpose of forming a bore of a diameter to snugly fit the smooth shank of a screw, while the circular cutting edge 15 serves as a means for cutting a bore of a larger diameter to receive the head of a screw. The inner section 12 is preferably of solid formation and is formed at its upper edge with an integral head 20 of an appropriate diameter to be snugly received within the bore of the intermediate section 11 for the purpose of guiding and maintaining the inner section 12 in axial alinement. The lower portion of the section 12 is formed to provide a bit 21 having the projecting lead screw 22 at its lower or outer end, said bit being employed for the purpose of forming a bore within which the threads of the threaded portion of the shank of a screw will properly engage for anchoring the screw in position. A coiled contractile spring 23 is arranged within the outer section 10 between the closure head 13 and the head 18 of the intermediate section 11 for normally effecting the outward projection of said intermediate section from the outer section. A coiled contractile spring 24 is arranged within the intermediate section between the heads 18 and 20 for normally effecting the outward projection of the section 12 from said intermediate section.

In order to provide means for locking and retaining the sections 10 and 11 in relatively adjusted positions, set screws 25 and 26 are employed which extend through the section 10 and are provided with external manipulating heads. The inner ends of the set screws are provided with reduced projecting extremities 27. The section 11 is provided with a recess 28 adjacent the head 18 which may receive and coact with the extremity 27 of either of the screws 25 or 26 for the purpose of retaining and locking the section 11 in either its projected or retracted position as illustrated respectively in Figs. 1 and 2. The section 11 is further provided with an annular shoulder 29 above which an annular groove 30 is provided to form a second shoulder 31. In spaced relation and above the groove 30 is a recess 32 which communicates with the annular groove 30 by a longitudinal groove 33 of less depth than the depth of the recess 32 and the annular groove 30. The purpose of said grooves and recesses will be hereinafter set forth. In order to provide means for locking and maintaining the inner section 12 in various projected or retracted positions with respect to the section 11, a plurality of recesses 35 are formed in the shank of said section 12 with which the inner extremity 36 of a set screw 37 coacts, the said set screw extending through the section 11 and provided with an outer or exposed kerf 38 or other manipulating means. In addition to the recesses 35 the shank of the section 12 is provided with an intermediate annular groove 39 which is in turn provided with a longitudinal groove 40 which terminates at its upper end in a recess 41, the purpose of which will be hereinafter set forth.

To employ the tool in its capacity for forming a screw-receiving opening as illustrated in Fig. 6, the reduced extremity 27 of the set screw 26 is arranged in the recess 28 as illustrated in Fig. 1, to lock and retain the section 11 in partially projected relation, at the same time the extremity 36 of the set screw 37 is arranged in one of the recesses 35 of the shank of the innermost section 12. It will thus be seen that three cutting elements, namely, the circular cutting edge 15 and cutting teeth 16 of the section 10, the external cutting teeth 19 of the section 11 and the bit 21 of the section 12 are arranged in axial prolongation. The shank 14 is then associated with a brace and is employed for simultaneously forming a screw-receiving opening as illustrated in Fig. 1 which includes an inner bore A, an intermediate bore B, and an outer bore C, the inner to receive the threaded extremity of the screw shank, the intermediate to receive the smooth portion of the shank, and the outer to receive the head of the screw and the usual form of plug or filler element inserted therein over the head. By this arrangement a single tool simultaneously forms the three bores, thus saving both time and labor by eliminating the three separate operations required at the present time and necessitating the use of three bits of different sizes being independently used. A further advantage resides in the fact that where three independent bits are used the proper alignment of the openings is not accurately insured.

Where the tool is employed for the purpose of forming an opening for the reception of a nail or a screw having an entirely threaded shank, the inner section 12 is retracted within the intermediate section 11 and retained in this position by engaging the extremity 36 of the set screw 37 in the recess 41 thereby locking the section 12 for turning movement with the intermediate section 11. When used in this manner two bores in axial prolongation are formed which are sufficient to accommodate a screw having an entirely threaded shank or a nail. In order to gage the depth of the cut of the tool to provide the deck with uniform openings for the reception of the screws or nails, an adjustable stop is provided embodying a sleeve 45 which fits over the outer section and which is provided with a set screw 46 selectively engageable within the openings or recesses 47.

Where the tool is employed as a means for repairing decks or floors, which have become worn to a point where the nails, screws or other fastening elements are exposed and it is desired to drive the nails a further distance below the surface of the deck or floor to insert new plugs, the set screw 37 is retracted until its extremity 36 is disposed in alignment with the periphery of the groove 39 to permit of relative rotation and limited longitudinal or axial movement of the section 12 with respect to the section 11. At the same time the set screws 25 and 26 are retracted to withdraw the extremities 27 thereof from the recesses 28 and 32 and the section 11 is moved inwardly and the set screw 26 advanced until the same lies within the groove 30 to permit relative rotation and axial movement of said section 11 within section 10. The intermediate and inner sections 11 and 12 are then employed in the capacity of a centering guide and the cutting edge and teeth 15 and 16 are employed to cut an annular groove D concentric to and extending downwardly of the nail screw or other fastening device E. As the cutting edge and teeth move downwardly, the intermediate and inner sections 11 and 12 coming into contact with the head of the fastening element E will remain stationary by compressing the springs 23 and 24. As the tool is rotated for forming the annular groove D, the inner spiral convolutions 17 will engage and coact with the head of the fastening element E until the convolutions of lesser diameter engage and grip the peripheral head. By employing a lever inserted under the sleeve 45 fastening nails may readily be removed and new ones inserted. Where the fastening element E is a screw, the convolutions which have a left-handed pitch may be employed for unthreading the screw to effect its removal. Where it is desired to drive the same fastening element E downwardly to permit of the insertion of a new plug, the tool is retracted from the annular groove D thus formed and the inner and intermediate sections thereof together with the closure head 13 and springs are removed. The lower end of the outer section is then arranged as illustrated in Fig. 3 and a nail set or punch 50, together with a driving sleeve 51 are employed. In this instance the lower end of the section 12 is redriven into the annular groove D to act as a protection or a guard to the outer edge of the annular groove D when the nail is driven home. The sleeve 51 is then removed and by hammering on the upper end of the set 50 the nail is driven downwardly until the head is substantially flush with the bottom of the annular groove. A new plug is then inserted to complete the repairing operation.

I claim:

1. A tool embodying outer, intermediate and inner sections, a circular cutting edge and internal cutting teeth at the lower end of the outer section, external cutting teeth at the lower edge of the intermediate section, a bit formed at the lower end of the inner section, means carried respectively within the outer and intermediate sections for effecting the projection of the intermediate section from the outer section and the inner section from the intermediate section, and means for retaining said sections against relative axial and rotary movement.

2. A tool embodying outer, intermediate and inner sections, a circular cutting edge, internal cutting teeth and spiral convolutions above the cutting teeth at the lower end of the outer section, said spiral convolutions being of gradually decreasing diameters, external cutting teeth at the lower end of the intermediate section, a bit formed at the lower end of the inner section, means carried respectively within the outer and intermediate sections for effecting the projection of the intermediate section from the outer section and the inner section from the intermediate section, and means for retaining said sections against relative axial and rotary movement.

3. A tool for the laying, repairing or refinishing of decks, floors, or the like, comprising relatively adjustable outer, intermediate and inner telescopic sections, the former having a circular cutting edge and internal cutting teeth and the latter external cutting edges disposed at the lower ends of said sections, means for effecting axial movement of said sections to project the lower ends of the same from each other, and means for locking said sections against relative axial movement and to respectively permit or prevent relative rotary movement whereby the same may be employed for forming a multiplicity of screw-receiving openings in axial prolongation or as a means for cutting a concentric annular groove about a fastening element for driving the same further inward or for effecting its removal.

OLE K. BOGSTRAND.